Figure 3:
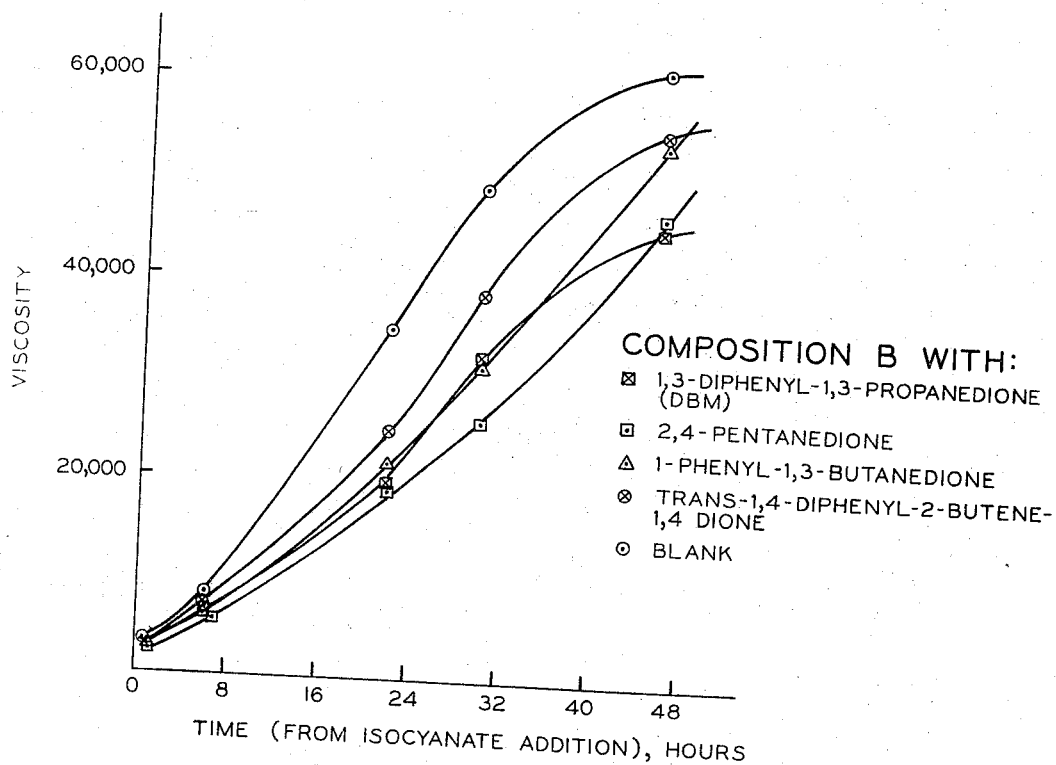
Figure 4:
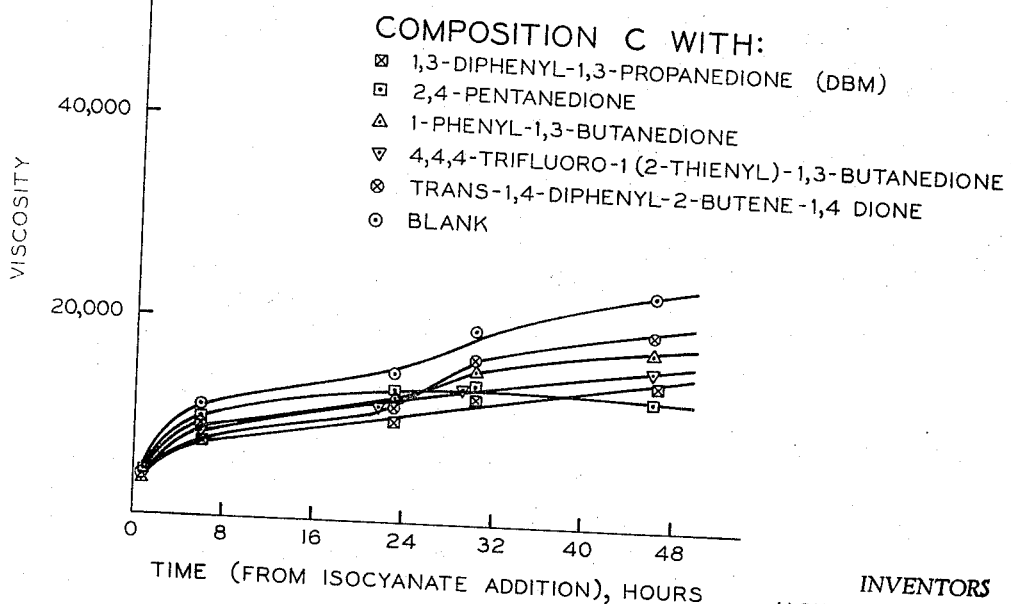

April 18, 1967
E. J. WALDEN ETAL
3,314,834
METHOD OF POT LIFE EXTENSION FOR POLYURETHANE PROPELLANTS
Filed Dec. 14, 1962
3 Sheets-Sheet 1
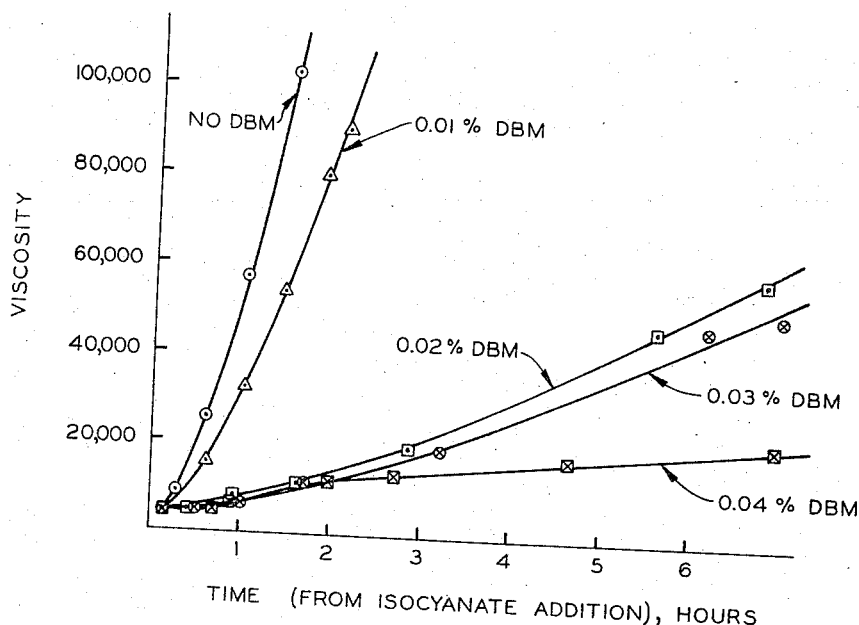
FIG_1_
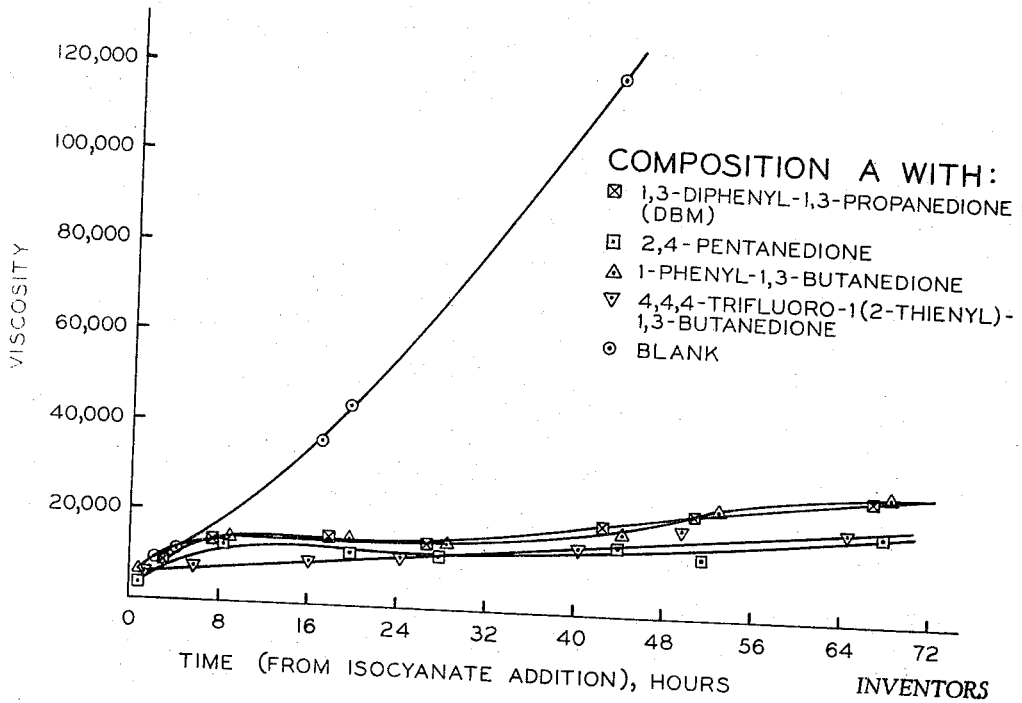
FIG_2_
INVENTORS
JACK K. WEST
ERNEST J. WALDEN
BY
Eckhoff & Slick
ATTORNEYS

United States Patent Office 3,314,834
Patented Apr. 18, 1967

3,314,834
METHOD OF POT LIFE EXTENSION FOR POLYURETHANE PROPELLANTS
Ernest J. Walden, Mountain View, and Jack K. West, Palo Alto, Calif., assignors to United Aircraft Corporation, a corporation of Delaware
Filed Dec. 14, 1962, Ser. No. 244,753
7 Claims. (Cl. 149—19)

This invention relates to the formulation of solid propellants and more particularly relates to a method of extending the pot life of polyurethane propellants. In the formulation and processing of polyurethane solid propellants, it is frequently difficult to obtain sufficient pot life of the propellant composition so that it can be thoroughly mixed prior to casting. Upon combining the ingredients, the mixture starts to become viscous, so the mixing operation becomes difficult, and also requires that the propellant grain be cast immediately. Naturally, the problem becomes more severe with the larger propellant grains. The problem is particularly acute when metallic compounds, such as burning rate catalysts, are employed in the propellant mixture, since such compounds also tend to act as cure catalysts or catalyst activators. Although it is common to improve the pot life of polyurethane systems by increasing the hydrolyzable chloride content in the system, this technique is ordinarily not useful when burning rate catalysts are used, and further the adjustment of the hydrolyzable chloride content may alter the curing mechanism so that long cure times are required. Another proposed method of regulating pot life of polyurethane propellants is in the reduction of the amount of the cure catalyst. However, this method increases the cure time unduly and frequently results in a soft or incomplete cure.

In the drawings forming a part of this application:
FIGURES 1-5 are graphs showing the effect of various additives on pot life extension.

In accordance with the present invention, it has been found that diketo compounds form effective pot life extension agents in polyurethane propellants, permitting the employment of the usual burning rate catalyst and the usual quantities of cure catalyst yet not unduly increasing the final cure time and not interfering with a complete, hard cure.

In one typical propellant system, when the burning rate catalyst was omitted, the system had a pot life of approximately four hours at 75° F. As used herein, "pot life" is defined as the time required for the viscosity to reach 20,000 poise when measured by a Brookfield viscometer with a helipath stand and a TF spindle rotating at 0.5 r.p.m. When 1% of a burning rate catalyst was added, the pot life was reduced to less than ½ hour. However, by the employment of 0.04% dibenzoyl methane, pot life was extended to over five hours.

This invention is not based on any theory of its operation but it is believed that the diketo compound acts as a chelating agent with the ferric ion of the cure catalyst at relatively low temperatures, preventing or decreasing the rate of curing, and that at the normal curing temperature of 110° F. or higher, the ferric ion is released to catalyze the isocyanate reaction.

The invention is applicable to polyurethane made from various symmetric isocyanates such as hexamethylene diisocyanate; 3,3'-dimethyldiphenylmethane 4,4'-diisocyanate; and toluene-2,4-diisocyanate. The isocyanate is polymerized with a polyhydroxy organic compound, as is well known to those skilled in the art.

The diketo compounds which have been found useful as pot life extension catalysts have the general formula

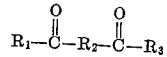

wherein $R_1$ and $R_3$ are organic radicals which may be the same or different and which may be alkyl, aromatic or heterocyclic and which may or may not contain substituents such as halogen atoms. $R_2$ is a lower alkylene or alkenyl radical having one or two carbon atoms. Typical non-limiting examples of the compounds which can be used are:

2,4-pentanedione
1-phenyl-1,3-butanedione
4,4,4-trifluoro-1(2-thienyl)-1,3-butanedione
Trans-1,4-diphenyl-2-butene-1,4-dione
1,3-diphenyl-1,3-propanedione (also called dibenzoylmethane).

Of these compounds, dibenzoylmethane is preferred because of its high effectiveness, lower cost, and ready availability.

The quantity of the diketo compound which is utilized is quite small and is preferably approximately twice the amount of the curing catalyst which is used. On a molecular basis, about 3 moles of the diketo compound is used for each mole of the curing catalyst.

In order to illustrate various aspects of the present invention, the following compositions were prepared. Hereinafter, when the term "blank" is used, it is understood to mean one of the following compositions, and when an additive is shown, it will be understood that this is the percent by weight of the named additive which has been added to one of these three compositions.

| Ingredient (All parts by weight) | Composition | | | |
|---|---|---|---|---|
| | A | B | C | D |
| Polypropylene glycol (Dow P-2000, diol) | 39.02 | 35.80 | 39.07 | 39.02 |
| Polyoxybutylene (Dupont LD-124, diol) | 18.79 | 17.24 | 18.75 | 18.79 |
| Polypropylene adduct of glycerine (Dow 11-80, triol) | 2.18 | 2.00 | 2.18 | 2.18 |
| Triethanolamine | 0.47 | 0.43 | 0.47 | 0.47 |
| Hexamethylene diisocyanate | 8.17 | | | 8.17 |
| 3,3'-dimethyldiphenylmethane-4-4'-diisocyanate (Dupont Hylene DMM) | | 13.16 | | |
| 2,4-tolylene diisocyanate (Dupont Hylene T) | | | 8.29 | |
| Aluminum powder | 18.00 | 18.00 | 18.00 | 18.00 |
| Ammonium perchlorate | 10.00 | 10.00 | 10.00 | 10.00 |
| Lecithin (Yelkins TTS) | 0.01 | 0.01 | 0.01 | 0.01 |
| Sulfur | 0.20 | 0.20 | 0.20 | 0.20 |
| Ferric acetylacetonate (cure catalyst) | 0.04 | 0.04 | 0.04 | 0 |
| Dibutyl tin dilaurate (cure catalyst) | 0 | 0 | 0 | 0.04 |
| Copper chromite (Harshaw $CuO_2O_2$, burning rate catalyst) | 1.00 | 1.00 | 1.00 | (1) |
| Silicon dioxide (Cabosil, filler) | 2.00 | 2.00 | 2.00 | 2.00 |

Figure 5:
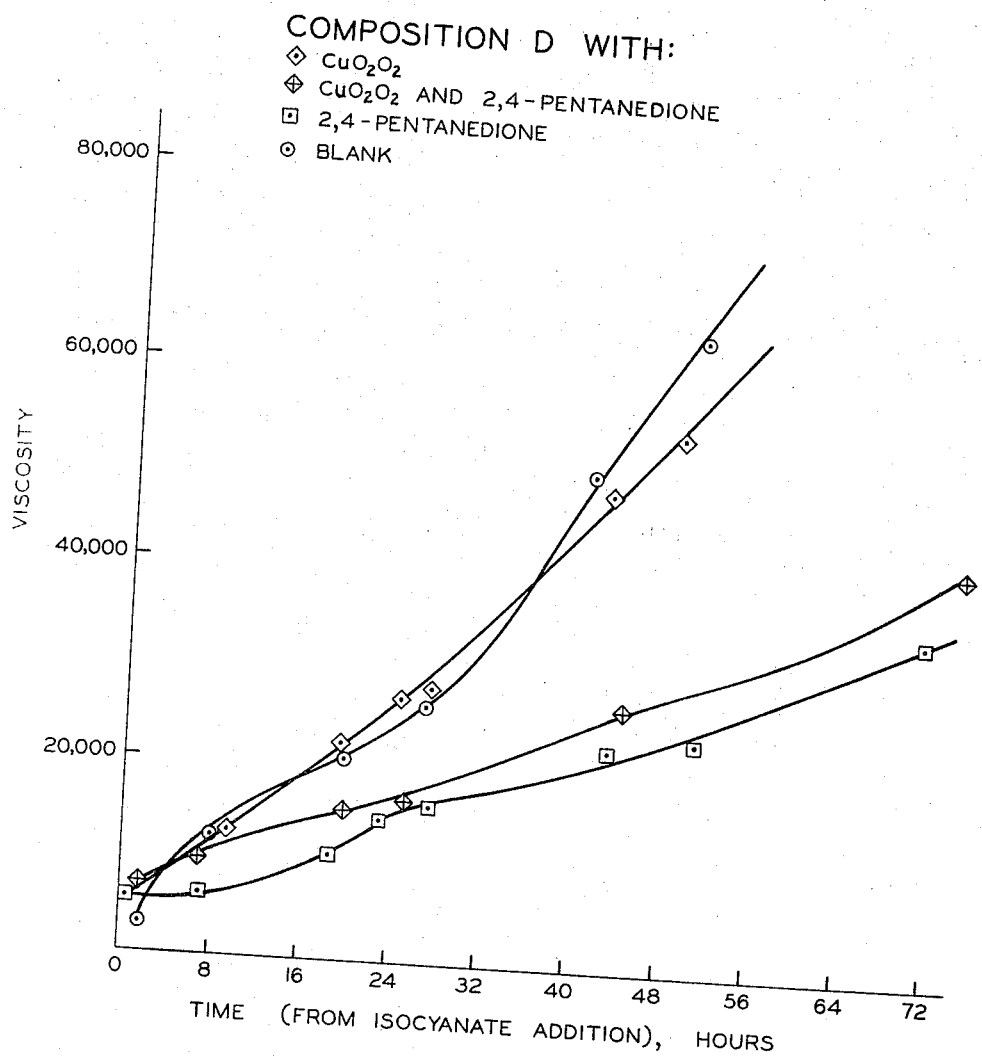

[1] See Fig. 5.

In a first series of tests, composition A was prepared and varying quantities of dibenzoylmethane (abbreviated DBM) were added. The results are set forth in FIGURE 1 of the accompanying drawings. It will be seen from the drawing that as little as 0.01% DBM appreciably increased the pot life of the polyurethane propellant and that when the quantity was increased to as much as 0.04%, it required over six hours for the viscosity to rise above 20,000 poises.

To further illustrate the invention, the compositions set forth in the preceding table were prepared except that 0.12% by weight of various of the diketo compounds mentioned above were added to each of the compositions. The results are summarized in FIGURES 2, 3 and 4 and it will be seen that in each instance the diketo compound appreciably extended the pot life of the polyurethane propellant mixture.

In composition D and the graph of FIGURE 5, dibutyl tin laurate was substituted for the ferric acetylacetonate of the other compositions. Also, comparisons were made with and without 1% of copper chromite and with and without 0.12% by weight of 2,4-pentanedione. It will be seen that the dibenzoyl compound greatly extended the pot life both with and without the presence of the burning rate catalyst.

We claim:
1. In the process of making a polyurethane propellant wherein a diisocyanate is polymerized with a polyhydroxy organic compound in the presence of a curing rate catalyst, the improvement comprising: adding to the composition a diketo compound of the formula

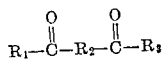

wherein $R_1$ and $R_3$ are alkyl, haloalkyl and aromatic radicals and $R_2$ is selected from the group consisting of lower alkylene and lower alkenyl radicals.

2. The method of claim 1 wherein the composition contains a cure catalyst selected from the group consisting of dibutyl tin laurate and ferric acetylacetonate and wherein the amount of the diketo compound is about 3 times the weight of the cure catalyst.

3. The composition of claim 1 wherein the diketo compound is 2,4-pentanedione.

4. The composition of claim 1 wherein the diketo compound is 1-phenyl-1,3-butanedione.

5. The composition of claim 1 wherein the diketo compound is 4,4,4-trifluoro-1(2-thienyl)-1,3-butanedione.

6. The composition of claim 1 wherein the diketo compound is trans-1,4-diphenyl-2-butene-1,4-dione.

7. The composition of claim 1 wherein the diketo compound is 1,3-diphenyl-1,3-propanedione.

References Cited by the Examiner

FOREIGN PATENTS 1,291,647  3/1962  France.

CARL D. QUARFORTH, *Primary Examiner.*

L. A. SEBASTIAN, *Assistant Examiner.*